(12) United States Patent
Sikharulidze

(10) Patent No.: US 7,796,199 B2
(45) Date of Patent: Sep. 14, 2010

(54) DISPLAY

(75) Inventor: David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 11/969,270

(22) Filed: Jan. 4, 2008

(65) Prior Publication Data

US 2008/0165295 A1 Jul. 10, 2008

(30) Foreign Application Priority Data

Jan. 5, 2007 (GB) .................................. 0700187.8

(51) Int. Cl.
*G02F 1/13* (2006.01)

(52) U.S. Cl. ............................ 349/2; 349/187; 359/296; 345/107; 345/54

(58) Field of Classification Search ................ 349/2, 349/187, 65, 61, 63; 430/20; 359/296, 452; 345/107, 84, 87, 54, 31, 105; 347/153, 112; 399/130, 158

See application file for complete search history.

(56) References Cited

U.S. PATENT DOCUMENTS 4,305,807 A * 12/1981 Somlyody .................. 349/166

| | | | |
|---|---|---|---|
| 2003/0011868 A1 | 1/2003 | Zehner et al. | |
| 2005/0093829 A1 | 5/2005 | Shaked et al. | |

FOREIGN PATENT DOCUMENTS

| | | |
|---|---|---|
| GB | 2 405 218 A | 2/2005 |
| JP | 2002236471 A | 2/2001 |
| WO | WO 2004/090624 A1 | 10/2004 |

* cited by examiner

*Primary Examiner*—Thoi V Duong

(57) ABSTRACT

An aspect of the invention provides a method of recording an image, comprising: providing a display cell having a first cell wall and a second cell wall opposed to the first cell wall, the cell walls enclosing a layer of a display medium comprising a liquid crystal material having finely-divided pigment particles dispersed therein, each cell wall including an electrode for applying an electric field across the display medium; applying via the electrodes a first electric field of a first polarity and of sufficient magnitude and duration to cause the particles to migrate and accumulate at the first cell wall; illuminating at least some of the particles with an image to be recorded; and applying via the electrodes a second electric field of opposite polarity to the first polarity and of sufficient magnitude and duration to cause some but not all particles to migrate from the first cell wall so as to produce a recorded image.

6 Claims, 5 Drawing Sheets

DISPLAY

This application claims priority to co-pending United Kingdom patent application number 0700187.8 filed on Jan. 5, 2007, which is entitled "DISPLAY" the disclosure of which is incorporated herein by reference.

The present invention relates to a display, and to a method of recording an image on the display and a method of erasing the image.

Practical paper-like displays require high brightness and bistability, preferably with low power consumption and simple construction. Many technologies have been employed in an attempt to develop such displays, including electrophoretic devices in which an image is formed by patterned electrodes which define pixels. An example of such a device is described in US20050094087A1.

According to a first aspect of the invention there is provided a method of recording an image, comprising:

providing a display cell having a first cell wall and a second cell wall opposed to the first cell wall, the cell walls enclosing a layer of a display medium comprising a liquid crystal material having finely-divided pigment particles dispersed therein, each cell wall including an electrode for applying an electric field across the display medium;

applying via the electrodes a first electric field of a first polarity and of sufficient magnitude and duration to cause the particles to migrate and accumulate at the first cell wall;

illuminating at least some of the particles with an image to be recorded; and applying via the electrodes a second electric field of opposite polarity to the first polarity and of sufficient magnitude and duration to cause some but not all particles to migrate from the first cell wall so as to produce a recorded image.

The invention provide a photoaddressable display device with bistability. The device provides a display with lower power consumption than many conventional displays. The device may be of simple construction and can produce an image of high contrast and brightness, making it potentially suitable for use as a paper-like display.

I have found that, surprisingly, the behaviour of the particles under an electric field differs according to the extent to which the particles have been illuminated by light. Without wishing to be bound by theory, I believe that the illumination locally reduces electrostatic stabilisation parameters of the display medium, enabling optically-controlled spatial modulation of the electrophoretic effect and bistable recording of optical images. I theorize that photosensitivity and charge generation are provided by the intrinsic features of the LC mixture with the pigment particles, due to interaction of LC molecules with the pigment surface, when the LC mixture when placed between electrodes.

In one embodiment, the particles which migrate from the first cell wall under the second electric field accumulate at the second cell wall. Under this condition, the display cell displays a positive image when viewed through one cell wall, and a negative image when viewed through the other.

The term "light" is used herein to refer to visible light, and also to other wavelengths of light which produce the desired effect, for example ultraviolet light.

The image remains stable until erased. Erasure may be achieved by applying an electric field of opposite polarity to the first polarity and of sufficient magnitude to cause substantially all the pigment particles to migrate from the first cell wall. Alternatively, erasure may be achieved by applying an alternating electric field of sufficient magnitude and duration to cause substantially all the pigment particles to migrate from the first cell wall.

It will be understood that reference to an electric field of a particular polarity does not exclude a possible AC component, providing that the overall polarity is sufficient to effect the desired migration of particles.

BRIEF DESCRIPTION OF THE DRAWINGS

The invention will now be further described, by way of example, with reference to the following drawings in which.

DETAILED DESCRIPTION

Figures 1A, 1B:
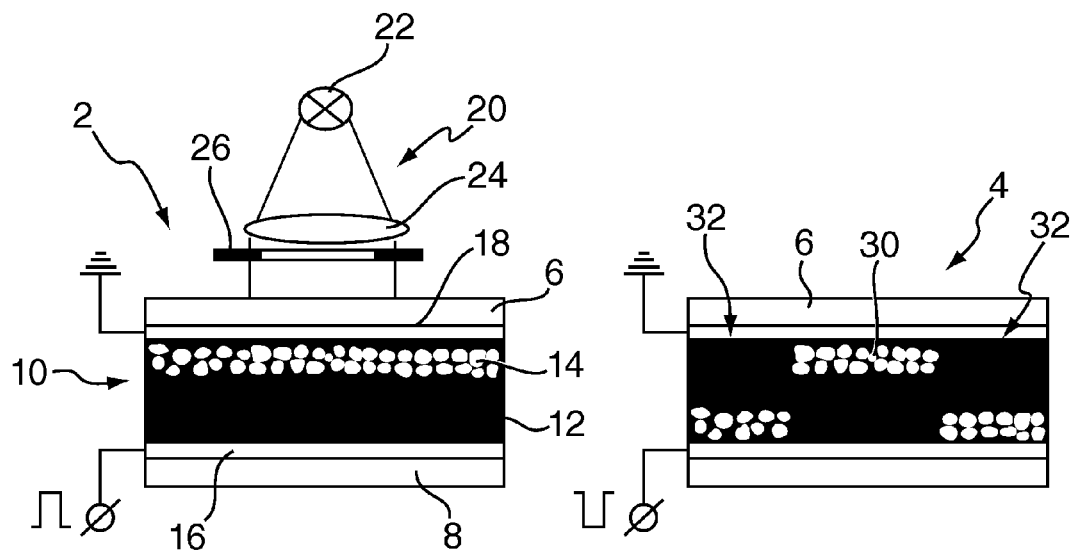
FIGS. 1A and 1B are a schematic views of a display device in accordance with an aspect of the invention.

The display device 2 of FIG. 1 comprises a display cell 4 and in image source 20 for directing a light image onto the display cell 4. The display cell 4 comprises a first cell wall 6 and an opposed second cell wall 8. The cell walls may be formed from glass or plastics materials known per se in the art of manufacturing liquid crystal displays. Each cell wall 6,8 has a corresponding electrode 18,16 on an inner surface thereof. In this embodiment each electrode 16,18 covers substantially all of the area of the cell wall on which it is provided.

The cell walls 6,8 enclose a layer of a display medium 10, which comprises a liquid crystal material 12 (in this example, a nematic liquid crystal material) having finely-divided pigment particles 14 dispersed therein. In this example, the liquid crystal material 12 has a black dye dissolved therein. The dye may be pleochroic or non-pleochroic, and simply functions to provide enhanced contrast to the pigment particles 30. The liquid crystal material 12 may have positive or negative dielectric anisotropy.

The pigment particles in this example are titanium dioxide ($TiO_2$) which provides a bright white image in reflective mode. The particles preferably have sizes less than 1000 nm, for example in the range 100-500 nm. The high refractive index (n=2.72) and size of the $TiO_2$ particles allow a direct observation of the electrophoretic effect which results in the collection of particles 14 close to the selected side of the display cell 4 under a suitable polarity of an applied voltage.

The image source 20 in this embodiment comprises a light source 22, a lens 24 and a mask 26. Light from the light source 22 is focused through the lens 24 and mask 26 to produce a light image which is directed onto the second cell wall 8 as shown in FIG. 1A. It will be understood that other image sources may be used, for example a light-emitting display such as a CRT, plasma panel, back-lit LCD panel or any other suitable image source well known to those skilled in the display arts.

Initially, the pigment particles 14 are caused to collect close to the first cell wall 6 by application of a first electric field of a first polarity via the electrodes 16,18. The voltage to achieve this will vary depending on the types of components in the display medium 10, but will typically be in the range 80-120 V, notably 100-110 V. This initial state, with pigment particles 14 collected close to the first cell wall 6 is illustrated in FIG. 1A.

The display cell 4 is then exposed with a light image from the image source 20, in this embodiment via the second cell wall 8. After this light exposure, a second electric field of opposite polarity to the first polarity is applied as a pulse sufficient to cause some, but not all, of the particles 14 to migrate from the first cell wall 6, thereby creating an image 28. Suitable pulse voltages will vary depending on the specific details of the system, but will typically be from 10-80 V, notably about 30-60 V, and 5-50 ms duration. The field strength will typically be in the range 3-6 V/$\mu$m.

The image 28 comprises first picture elements 30 in which pigment particles 14 are aggregated at the first cell wall 6, and second picture elements 32 in which pigment particles 14 are substantially not present at the first cell wall 6. Each first picture element 30 strongly reflects light when viewed through the first cell wall 6, and each second picture element 32 absorbs some or all light when viewed through the first cell wall 6, providing substantial contrast between the first and second picture elements. In the example shown in FIG. 1B, the particles 14 in the second picture elements 32 have gathered close to the second cell wall 8 so that if the display cell 4 is viewed through the second cell wall 8 the image appears as a negative of the image when viewed through the first cell wall 6. A mixture of small first picture elements 30 and small second picture elements 32 provides greyscale capability when viewed from a suitable distance.

Because the displayed image 28 is determined by the light image from the image source 20, first picture elements 30 and second picture elements 32 may both be contained within a region where the electrodes 16,18 overlap. In the present example, this region comprises substantially the entire area of the cell walls 6,8. It would of course be possible for each cell wall to be provided with more than one electrode, for example as 'row' electrodes on the first cell wall 6 and 'column' electrodes on the second cell wall 8; however such alternatives complicate the display without conveying any benefit, so the exemplified display cell 4 with a single electrode on each cell wall is preferred.

It will be understood that the image 28 may readily be reversed by reversing the polarities of the applied electric fields depending on the cell wall through which the display cell 4 is to be viewed.

Figure 2:
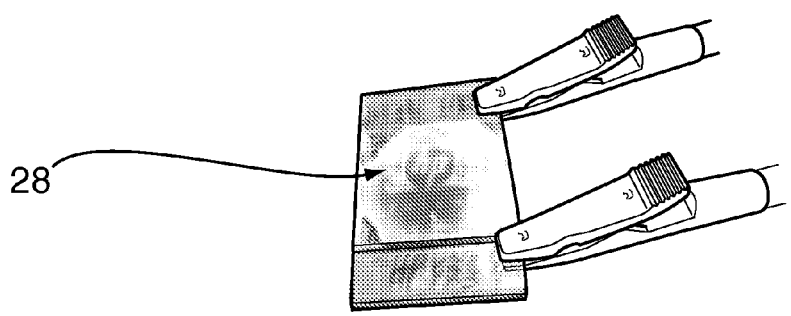
FIG. 2 shows a display cell in accordance with an embodiment of the invention.

The image 28 produced by the experimental display device 2 shown in FIG. 1 is a simple spot. More complex images 28 can readily be produced by using more complex masks, for example as illustrated in FIG. 2. The image 28 of FIG. 2 was produced using a display cell 4 with a spacing of 10 $\mu$m. The display medium 10 comprised 70% LC ZLI4756/2 doped with a black dye and 30% $TiO_2$ pigment WP10S.

The dielectric permittivity of the liquid crystal is believed to be changed in a region where the particles are concentrated, because the liquid crystal molecules will tend to be randomly aligned by local interactions with the pigment particles; consequently the dielectric permittivity will be low. Applying a voltage aligns the liquid crystal molecules, switching the dielectric permittivity to a higher value, due to which a large electrical dipole will be induced around the pigment particles.

Without wishing to be bound by theory, we believe that optical radiation with an applied strong field generates locally in the illuminated areas electrical charges which will reduce an electrical double layer around the pigment particles 14, providing electrostatic stabilisation relative to pigment particles in non-illuminated areas. Consequently, this promotes aggregation of pigment particles in the illuminated areas. Because of this, the applied pulse with reversed polarity and sufficient amplitude forces motion of the pigment particles in the non-illuminated areas (with a larger electrical double layer) towards the second cell wall 8 (FIG. 1B). This effect is believed to produce the spatial modulation of the electrophoretic effect and provide optically observed differences between the illuminated and non-illuminated areas.

The effect is bistable and both switched states are stable after removal of the voltage. Erasing of the image 28 is achieved by application of an electrical pulse with a higher amplitude (about 6-10 V/$\mu$m or higher), and alternatively by applying an alternating voltage.

Figure 3A:
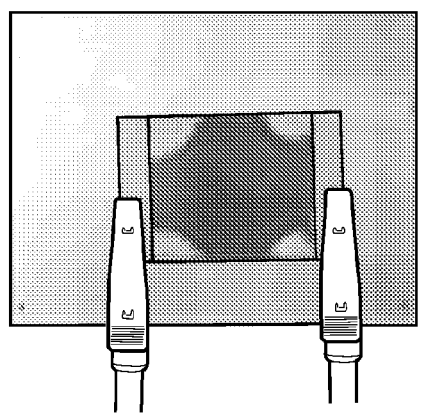
FIGS. 3A and 3B show an experimental display cell in accordance with an embodiment of the invention before and after having a light image recorded thereon.
Figure 3B:
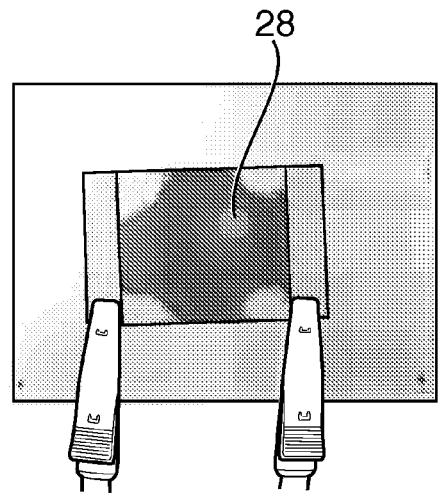
Figure 4A:
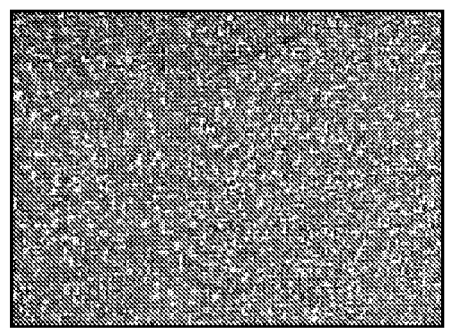
FIGS. 4A, 4B, and 4C show photomicrographs of regions of the display cell of FIG. 3.
Figure 4B:
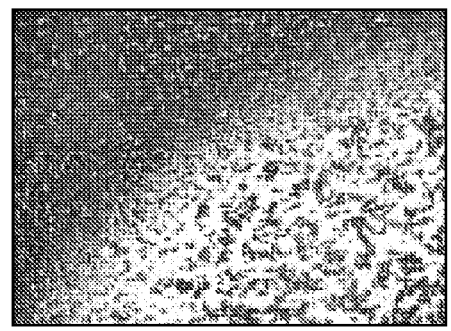
Figure 4C:
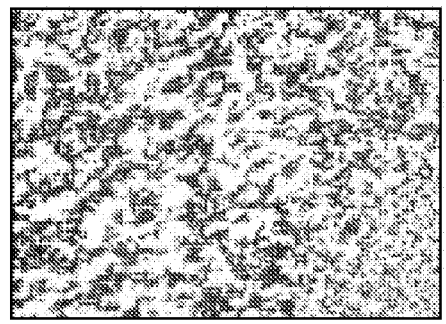

The aggregation of pigment particles 14 in the illuminated area was tested in transmissive mode in the 5 micron display cell 4 (FIG. 3), in which the display medium comprised 80% LC ZLI4756/2 doped with a black dye and 20% $TiO_2$ pigment WP10S. When an alternating voltage is applied across the display cell 4, which alternation is shorter than the drift time for pigments to drift from one cell wall to the other, the pigment particles do not collect close to the cell walls and will be uniformly distributed in the volume of the cell. In this case the display cell 4 scatters the transmitted light and the texture looks dart (FIG. 3A). Illumination induces the aggregation of the pigment particles 14 and consequently the illuminated area forms a transparent image 28 (FIG. 3B). This effect is clearly illustrated in the photomicrographs of FIG. 4. FIG. 4A shows the texture before illumination and FIG. 4B shows the boundary between illuminated and non-illuminated areas. FIG. 4C shows the texture inside the illuminated area, where large domains of aggregated pigment particles are observed.

Figure 5A:
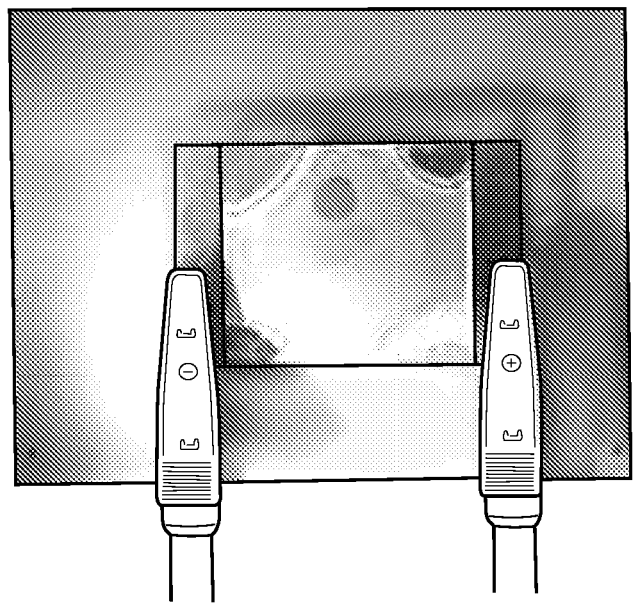
FIGS. 5A and 5B show an experimental display cell in accordance with an embodiment of the invention after having a light image recorded thereon; under light illumination on front and rear sides.
Figure 5B:
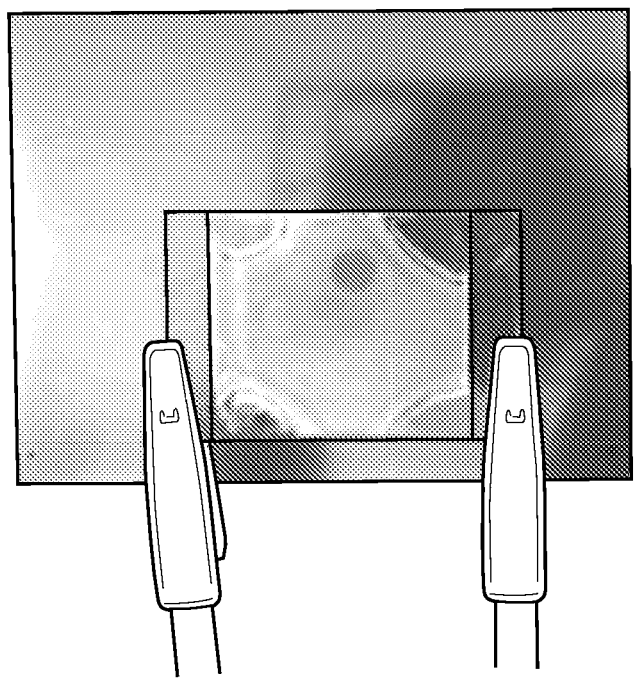

When such a cell is observed under light impinging on the front of the cell (FIG. 5A), the scattered texture reflects light and the written transparent spot substantially does not reflect light. Turning the cell over and illuminating its rear side (FIG. 5B) confirms that that the transparent texture of a written spot extends through the whole cell.

Figure 6:
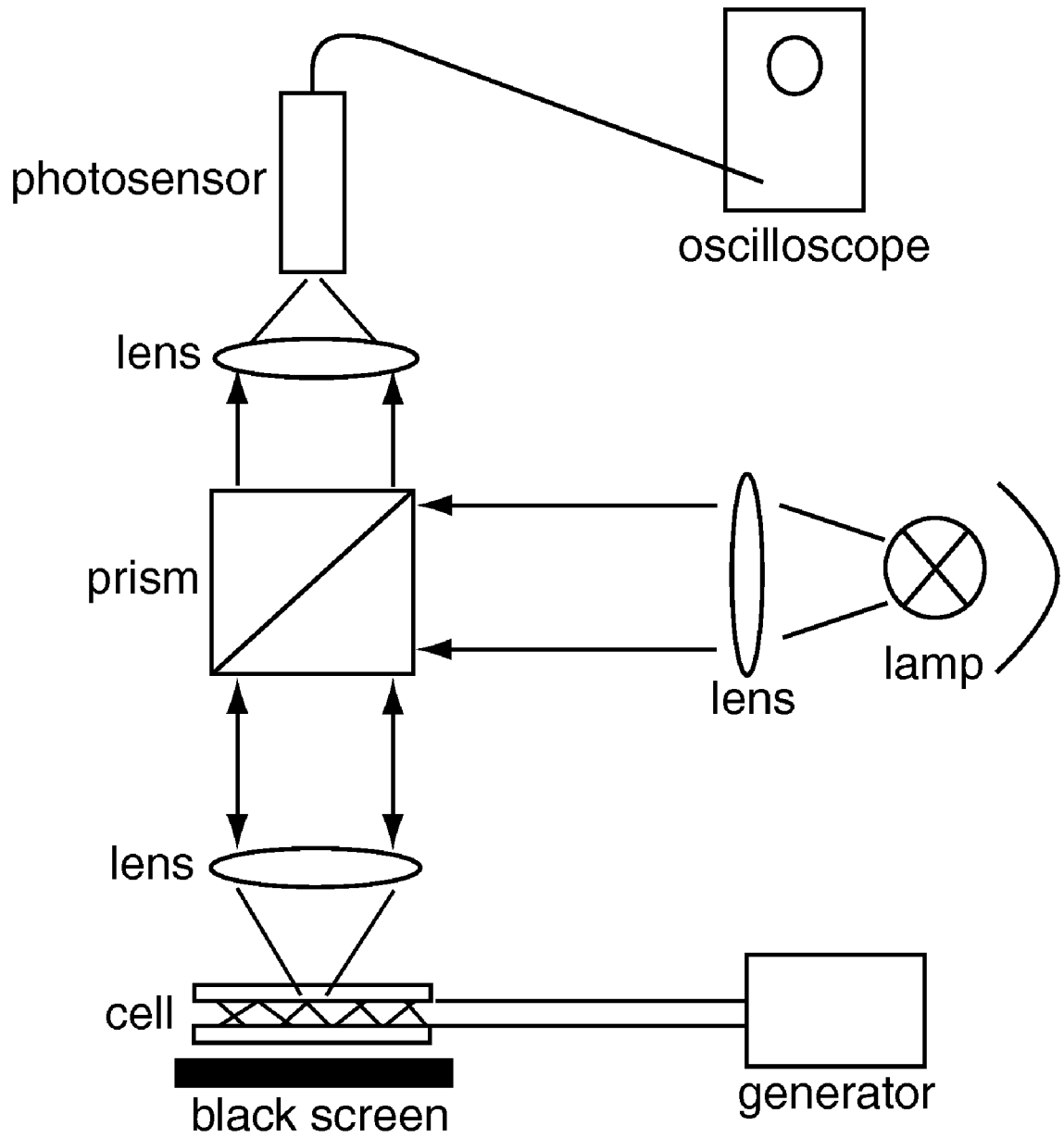
FIG. 6 is a schematic diagram of an experimental setup for investigation optical recording on display cell.

In this experiment, the light source 22 was a white light box with 150 Watt lamp, the output of which was fed through a fibre-optic cable with an output diameter of about 4 mm. The lamp provided controllable illuminance in the range 200-10000 lx. Another experiment was carried out using a microscope, with the experimental cell placed on microscope stage. As an optical source was used a microscope 20 Watt lamp, the light from which was focused to a spot about 2 mm in diameter. FIG. 6 shows the optics, in which the same light source is used for an optical writing and an optical detecting signal. In this case the light from the lamp is deflected by a prism to the cell. The transmitted light is focused by a lens into the spot about 2 mm. Behind the cell was placed a black screen (light absorber film). The reflected light from the cell passes back through the lens and the prism, and is detected by a photosensor, which is connected to an oscilloscope, displaying modulation of reflected light. To the cell are applied electrical pulses from the generator.

Figure 7:
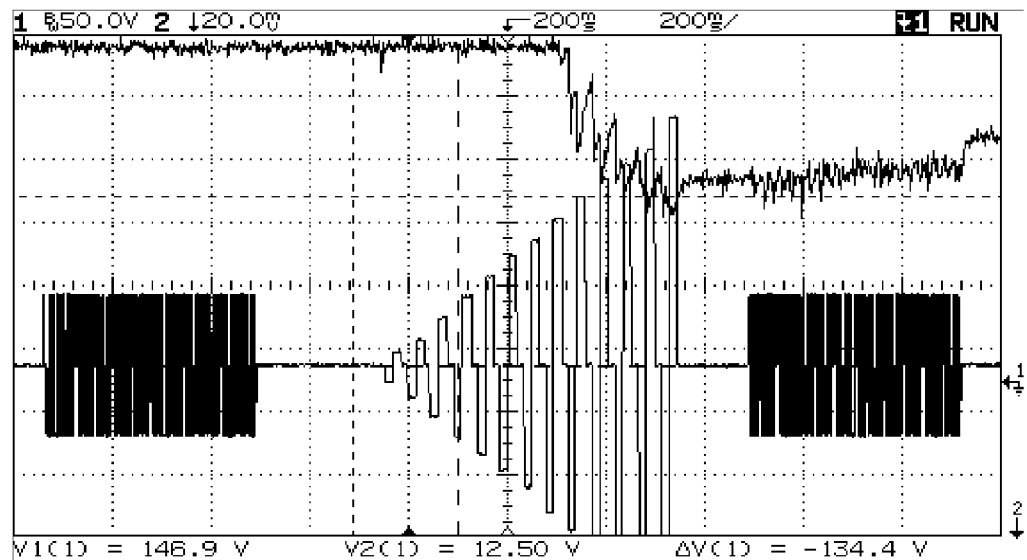
FIG. 7 shows an oscilloscope picture, displaying the optical response of a display cell with a black back screen under an applied combination of an electrical signal and microscope light (the upper curve displays the optical response and the lower curve the applied electrical signal)

Bursts of bipolar pulses (FIG. 7) were applied to the cell. One of the bursts contains 2 ms bipolar pulses with repetition frequency 200 Hz, and a second burst contains 20 ms bipolar pulses with increasing amplitude and a repetition frequency of 50 Hz. As follows from the oscilloscope picture the intensity of the reflected light is decreased beginning from some amplitude of applied voltage. This indicates that in the specified case for the amplitude about 100 V, the light spot produces a writing effect, and in the spotted area the texture becomes transparent. Due to this the light will be absorbed by the black layer and consequently the optical response is decreased. The next pulse pocket has less amplitude and a pulse duration of 2 ms, which is less then the time drift across the cell. Accordingly, this pulse pocket produces a transition of the written texture to the scattered texture with uniform distribution of pigments in the cell volume and consequently the intensity of reflected light is increased. The experiment shows that the magnitude of the electrical field strength is important for the optical effect. For the specified case the microscope light produces an optical effect when the amplitude reaches a value about 100 V for a pulse duration of about 20 ms.

Figure 8:
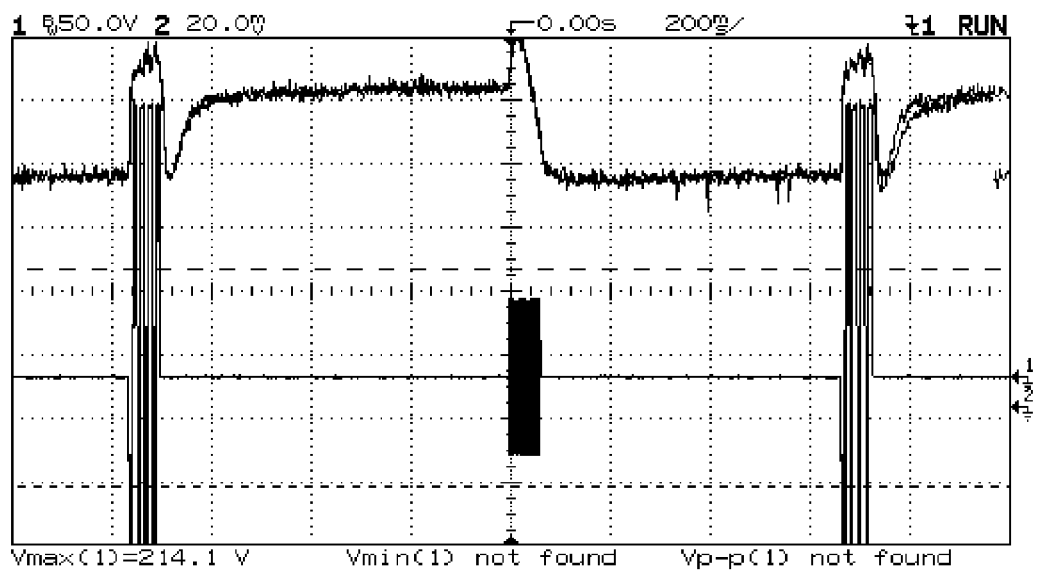
FIG. 8 shows an oscilloscope picture, displaying the optical response of the display cell with a mirror on its back side under applied combination of an electrical signal and microscope light (the upper curve displays optical response and the lower curve applied electrical signal).

The optically written state has a quite good transparent texture for a cell with 5 µm thickness. For a further experiment, the optical scheme shown in FIG. 6 was used but with the black layer replaced by a mirror. FIG. 8 shows modulation of reflected light from the cell under two bursts of applied bipolar pulses: one with amplitude more than 100 V and length 5 ms with repetition frequency of 80 Hz, and the other with amplitude 60 V and length 2 ms with repetition frequency 200 Hz. As follows from the pictures the burst with high amplitude produces a high intensity of reflected light. This result suggests that the spotted area becomes transparent and light passes through this LC texture and reflects back from the mirror with high intensity. The burst with lower amplitude does not produce this optical effect and only uniformly disperses the pigments in the whole cell. Consequently this state reflects less light from the same spotted area. A quite big difference between intensities of reflected light indicates that the optically induced state has a good transparency.

If we suppose that the lamp's light provides irradiance 0.15 W (~100 lm), the light energy providing optical writing during an applied electrical pulse 20 ms will be around $0{,}15\ J/s \times 2.10^{-2}\ s \approx 0.003\ J$. The experiment shows that this effect gives a possibility to modulate light by controlling the transparency of the electrophoretic cell by applying a suitable combination of electrical and optical signals.

Experimentally the display cells 4 have been constructed from glass or plastic cell walls with transparent ITO electrodes. Switching was obtainable using uncoated electrodes. However, for better switching uniformity, both of the cell walls over the ITO electrodes were covered by a thin layer providing local homeotropic alignment to the liquid crystal material 12. Polymer beads (not shown) were used to control the spacing between the cell walls. The size of the polymer beads ranged from 5-20 µm. The following commercial nematic liquid crystal materials from Merck were used: E7, ZLI2293, MLC6681, MLC6650, MLC6204-000, MLC6436-000 doped by blue and magenta dyes or by CuO black pigment; dye-doped nematics ZLI3752, ZLI4756/2 (all with positive dielectric anisotropy) and ZLI4788, MDA-03-4518, MDA-03-4517, dye-doped ZLI6092 (all with negative dielectric anisotropy). These were doped with $TiO_2$ particles. The $TiO_2$ particles used were: R700, R900, R931, R106 with sizes 300-400 nm (DuPont) and WP10S, RP10S with sizes 200-300 nm (Catalysts & Chemicals Ind. Co. Ltd). The concentration (by weight) of the particles in the display medium 10 varied from 5-50%. To the display cell 4 were applied unipolar pulses with amplitude 10-80 V, and pulse duration 5-50 ms.

The pure nematic LCs with transparent pigments Hosteperm Blue B2G-D, Hosteperm Magenta E02, Novoperm Yellow 4G (from Clariant) were also used.

The invention therefore provides optical addressing in an electrophoretic device, which gives the possibility of reversible photographic recording. We believe that the combination of electrical field and optical radiation locally reduces electrostatic stabilisation parameters of the fluids with added pigment particles, enabling optically controlled spatial modulation of the electrophoretic effect.

What is claimed is:

1. A method of recording an image, comprising:
   providing a display cell having a first cell wall and a second cell wall opposed to the first cell wall, the cell walls enclosing a layer of a display medium comprising a liquid crystal material having finely-divided pigment particles dispersed therein, each cell wall including an electrode for applying an electric field across the display medium;
   applying via the electrodes a first electric field of a first polarity and of sufficient magnitude and duration to cause the particles to migrate and accumulate at the first cell wall;
   illuminating at least some of the particles with an image to be recorded; and
   applying via the electrodes a second electric field of opposite polarity to the first polarity and of sufficient magnitude and duration to cause some but not all particles to migrate from the first cell wall so as to produce a recorded image.

2. A method according to claim 1, wherein the first electric field has a field strength greater than about 6 V/µm.

3. A method according to claim 1, wherein the second electric field has a field strength in the range 3-6 V/µm.

4. A method according to claim 1, wherein the application of the second electric field causes particles which migrate from the first cell wall to accumulate at the second cell wall.

5. A method of erasing an image produced by the method of claim 1, comprising applying an electric field of opposite polarity to the first polarity and of sufficient magnitude to cause substantially all the pigment particles to migrate from the first cell wall.

6. A method of erasing an image produced by the method of claim 1, comprising applying an alternating electric field of sufficient magnitude and duration to cause substantially all the pigment particles to migrate from the first cell wall.

* * * * *